(12) United States Patent
Saito

(10) Patent No.: US 6,765,768 B2
(45) Date of Patent: Jul. 20, 2004

(54) THIN-FILM MAGNETIC HEAD HAVING ENSURED INSULATION BETWEEN SHIELD AND MAGNETIC DETECTING ELEMENT

(75) Inventor: Masamichi Saito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 134 days.

(21) Appl. No.: 10/109,193

(22) Filed: Mar. 28, 2002

(65) Prior Publication Data

US 2002/0141119 A1 Oct. 3, 2002

(30) Foreign Application Priority Data

Apr. 2, 2001 (JP) ........................................ 2001-103346

(51) Int. Cl.⁷ .............................................. G11B 5/127
(52) U.S. Cl. ..................................................... 360/319
(58) Field of Search ............................ 360/319, 324.11, 360/324.12, 324.1, 324.2, 327.32, 121, 126, 313, 125, 323, 320, 122

(56) References Cited

U.S. PATENT DOCUMENTS 6,177,207 B1    1/2001 Koike
6,292,334 B1    9/2001 Koike et al.
6,317,301 B2 *  11/2001 Narumi et al. ......... 360/327.32
6,563,677 B2 *  5/2003 Narumi et al. ............... 360/319
6,608,738 B2 *  8/2003 Sakakima et al. ..... 360/324.11

FOREIGN PATENT DOCUMENTS

JP      04298810 A   * 10/1992
JP      09138918 A   *  5/1997
JP        036511 A   *  2/2003

* cited by examiner

Primary Examiner—Allen Cao
(74) Attorney, Agent, or Firm—Brinks Hofer Gilson & Lione

(57) ABSTRACT

A thin-film magnetic head has a lower shield layer and an upper shield layer which are each composed of two layers of a first shield sub-layer and a second shield sub-layer. The second shield sub-layer has a specific resistance higher than that of the first shield sub-layer. Thus, even though the gap length become shorter, the second shield sub-layers and gap layers ensure electrical insulation, and therefore, an electrically insulative thin-film magnetic head can be achieved.

24 Claims, 6 Drawing Sheets

THIN-FILM MAGNETIC HEAD HAVING ENSURED INSULATION BETWEEN SHIELD AND MAGNETIC DETECTING ELEMENT

BACKGROUND OF THE INVENTION

1. Field of the Invention

The present invention relates to thin-film magnetic heads in which shield layers are disposed on gap layers on both surfaces of a magnetic detecting element. In particular, the present invention relates to a thin-film magnetic head in which the insulation between the shield layers and the magnetic detecting element can be ensured and which has excellent heat dissipation performance and the shield layers having improved soft-magnetic characteristics.

2. Description of the Related Art

FIG. 8 is a fragmentary sectional view of a known thin-film magnetic head when viewed from a side opposing a recording medium.

The thin-film magnetic head has a lower shield layer 1 formed of, for example, a NiFe alloy and a lower gap layer 2 formed of, for example, $Al_2O_3$ on the lower shield layer 1.

As shown in FIG. 8, a magnetic detecting element 3 is formed on the lower gap layer 2. The magnetic detecting element 3 has a hard bias layer 5 and an electrode layer 6 which are formed on both sides of a multilayer film 4 in the track width direction.

The magnetic detecting element 3 is a spin-valve thin-film sensor in which the multilayer film 4 is composed of, for example, an antiferromagnetic layer, a pinned magnetic layer, a nonmagnetic conductive layer, and a free magnetic layer.

An upper gap layer 7 is formed of, for example, $Al_2O_3$ on the magnetic detecting element 3 and an upper shield layer 8 is formed of, for example, a NiFe alloy on the upper gap layer 7.

As the demand for a high recording density is increasing, the distance between the shield layers 1 and 8, that is, a gap length GI, becomes shorter to achieve a narrower gap. In order to achieve a narrow gap, the thicknesses of the lower gap layer 2 and the upper gap layer 2 need to be reduced.

For example, if the recording density increases to 70 $Gbit/in^2$ from 40 $Gbit/in^2$, the gap length G1 between the shield layers 1 and 8 must be reduced to about 600 Å.

In this instance, if the thickness of the magnetic detecting element 3 is about 200 Å or more, the thicknesses of the lower gap layer 2 and the upper gap layer 7 must be about 200 Å or less.

However, if the lower gap layer 2 and the upper gap layer 7 have such a small thickness, they are liable to have pin holes, thus causing poor insulation between the magnetic detecting element 3 and the shield layers 1 and 8.

Poor insulation between the electrode layer 6 of the magnetic detecting element 3 and the upper shield layer 8 readily causes a short circuit between the electrode layer 6 and the upper shield layer 8, and this prevents an increase of reading output of the magnetic detecting element 3.

On the other hand, as the recording density is increased, the magnetic detecting element 3 more radiates heat. Accordingly, the heat must be conducted to the shield layers 1 and 8; hence, the gap layers 2 and 7 must have excellent heat dissipation performance.

Also, the shield layers 1 and 8 need to have a shielding function for absorbing an external magnetic field or noise to prevent the external magnetic field from affecting the magnetic detecting element 3. The shield layers 1 and 8, therefore, must be soft magnetic.

SUMMARY OF THE INVENTION

Accordingly, an object of the present invention is to provide a thin-film magnetic head in which the insulation performance between the shield layers and the magnetic detecting element can be ensured and which has an excellent heat dissipation performance and the shield layers having improved soft magnetic characteristics.

To this end, according to one aspect of the present invention, there is provided a thin-film magnetic head. The thin-film magnetic head includes a magnetic detecting element. Gap layers are disposed on both surfaces of the magnetic detecting element. Shield layers are each disposed on the corresponding gap layer. The magnetic detecting element side of at least one shield layer has a higher specific resistance than that of the other side.

For example, the shield layers each comprise a first shield sub-layer and a second shield sub-layer. The second shield-sub-layer is disposed on the corresponding gap layer and has a specific resistance higher than that of the first shield sub-layer.

The second shield sub-layers are electrically insulative due to the high specific resistance thereof. The electrical insulation of the thin-film magnetic head is, therefore, ensured by the gap layers and the second shield sub-layers. Thus, even if the thickness of the gap layers and the gap length become smaller, the insulation between the magnetic detecting element and the first shield sub-layers can be improved.

Also, by forming the second shield sub-layers with a thin film capable of ensuring electrical insulation, a heat dissipating thin-film magnetic head can be achieved. In this magnetic head, even if the temperature of the magnetic detecting element increases as the current density is higher according to increase of the recording density, heat can be released through the gap layers and the second shield sub-layers to the first shield sub-layers.

For example, the second shield sub-layers are formed of a magnetic material having a specific resistance higher than that of the first shield sub-layers. Hence, the second shield sub-layers which are formed of the magnetic material serve as shields as well as the first shield sub-layers.

In the present invention, therefore, the gap length G1 depends on the total thickness of the magnetic detecting element and the lower gap layers. Even though the gap length becomes smaller according to the demand for higher recording density, the second shield sub-layers can have a shielding function and improved electoral insulation performance.

Preferably, the first shield sub-layer and the second shield sub-layer are in contact with each other, thus generating a ferromagnetic bonding therebetween. Even if the second shield sub-layers have relatively worse soft magnetic properties such as magnetic permeability, the ferromagnetic bonding allows the soft magnetic first shield sub-layers to improve the soft magnetic characteristics of the second shield sub-layers. Thus, the second shield sub-layers can serve as adequate shield layers.

By forming the second shield sub-layers of a magnetic material having-a high specific resistance, a thin-film magnetic head can be achieved which have improved electoral insulation performance and an improved shielding function provided by both the first shield sub-layers and the second shield sub-layers.

The total thickness of the second shield sub-layer and the gap layer adjoining the second shield sub-layer may be in the range of 100 to 500 Å. Thus, a thin-film magnetic head having improved electrical insulation performance and excellent heat dissipation performance can be achieved.

Preferably, the total thickness is in the range of 100 to 200 Å. Thus, the present invention can be adapted event though the gap length is reduced to increase the recording density to 70 Gbit/in$^2$ from 40 Gbit/in$^2$.

Preferably, the thickness of the second shield sub-layer is in the range of 20 to 200 Å.

More preferably, the thickness of the second shield sub-layer is in the range of 20 to 100 Å.

Preferably, the thickness of the first shield sub-layer is in the range of 5×103 Å to 3 μm.

By setting the thicknesses of the first shield sub-layers and the second shield sub-layers in the above-described ranges, the electrical insulation performance and the heat dissipation performance can be improved.

Preferably, the second shield sub-layer comprises a magnetic oxide.

Specifically, the second shield sub-layer may comprise a Mn—Zn ferrite or a Ni—Zn ferrite.

Since such a magnetic oxide has a high specific resistance, the second shield sub-layers can have improved electrical insulation performance while having improved soft magnetic characteristics to serve as shield layers in association with the first shield sub-layers due to the ferromagnetic bonding between the first shield sub-layers and the second shield sub-layers.

The second shield sub-layer may comprise a magnetic material represented by $Fe_aM_bO_c$. M is at least one element selected from the group consisting of Ti, Zr, Hf, Nb, Ta, Cr, Mo., Si, P, C, W, B, Al, Ga, Ge, and rare earth elements, and a, b, and c representing atomic ratios satisfy the relationships of $50 \leq a \leq 70$, $5 \leq b \leq 30$, $10 \leq c \leq 30$, and $a+b+c=100$.

The second shield sub-layers may comprise a magnetic material represented by $(Co_{1-g}T_g)_xM_yL_zO_w$. T is Fe or Ni. M is at least one element selected from the group consisting of Ti, Zr, Hf, Nb, Ta, Cr, Mo, Si, P, C, W, B, Al, Ga, Ge, and rare earth elements; L is at least one element selected from the group consisting of Au, Ag, Cu, Ru, Rh, Os, Ir, Pt, and Pd; g representing an atomic ratio satisfies the relationship of $0 \leq g \leq 0.7$; y, z, and w representing atomic ratios satisfy the relationships of $3 \leq y \leq 30$, $0 \leq z \leq 20$, $7 \leq w \leq 40$, and $20 \leq y+z+w \leq 60$; and x represents the atomic ratio of the balance.

The second shield sub-layer may comprise a magnetic material represented by $Fe_dM_eN_f$. M is at least one element selected from the group consisting of Ti, Zr, Hf, Nb, Ta, Cr, Mo, Si, P, C, W, B, Al, Ga, Ge, and rare earth elements, and d, e, and f representing atomic ratios satisfy the relationships of $60 \leq d \leq 80$, $10 \leq e \leq 15$, $5 < f \leq 30$, and $d+e+f=100$.

The magnetic materials described above have a high specific resistance, and can have a specific resistance of, for example, $10^4$ μΩ·cm can be achieved depending on the composition ratio of the materials. By using the magnetic materials for the second shield sub-layers, therefore, the electrical insulation performance can be improved. In addition, the ferromagnetic bonding between the first and second shield sub-layers allows the first shield sub-layers to improve the soft magnetic characteristics of the second shield sub-layers, and thus the second shield sub-layers can serve as shield layers in association with the first shield sub-layers. The materials for the second shield sub-layers are not limited to the above, but may be any magnetic material having a high specific resistance.

DESCRIPTION OF THE PREFERRED EMBODIMENTS

Figure 1:
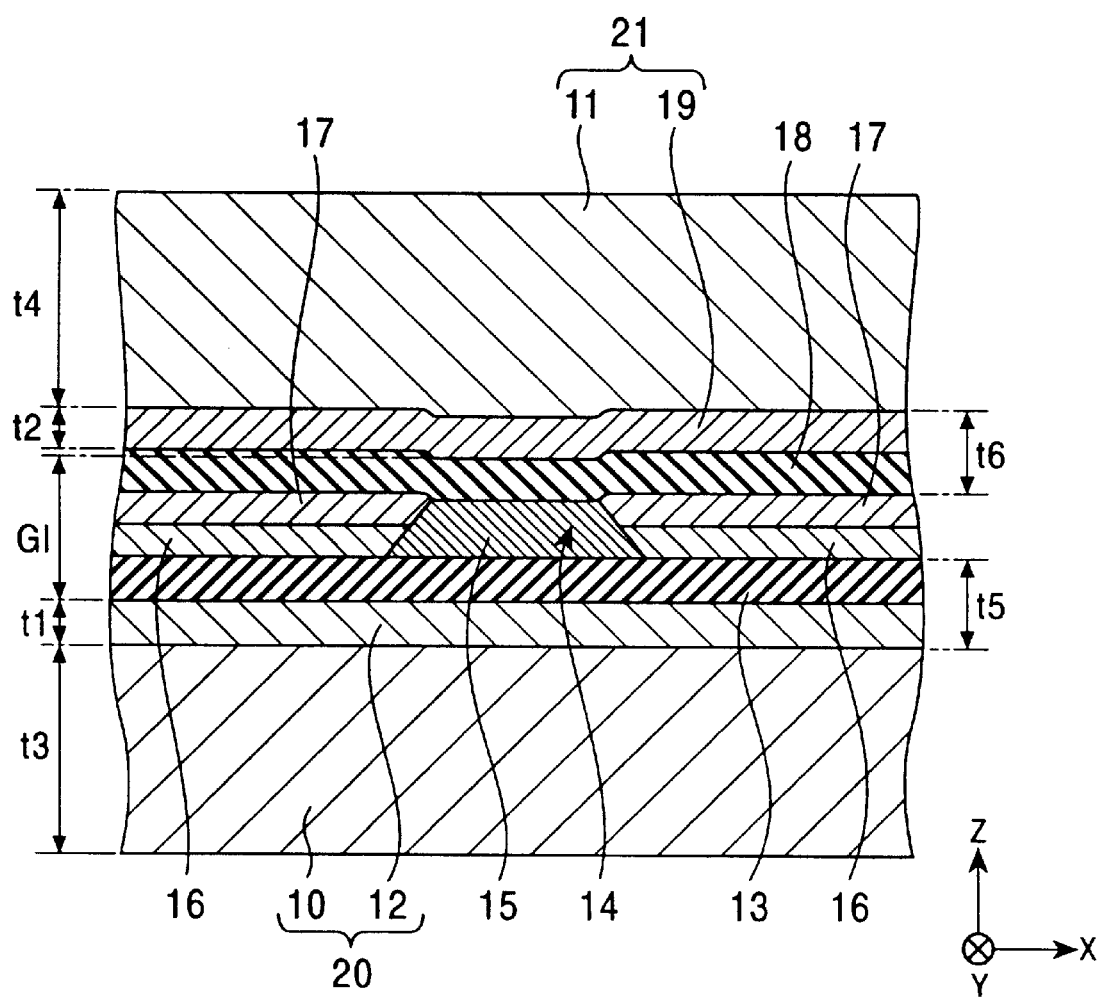
FIG. 1 is a fragmentary sectional view of a thin-film magnetic head according to a first embodiment of the present invention when viewed from a side opposing a recording medium.

FIG. 1 is a fragmentary sectional view of a thin-film magnetic head according to a first embodiment of the present invention when viewed from a side opposing a recording medium.

The thin-film magnetic head shown in FIG. 1 is a read head (MR head) for reading external signals and is formed on an end of a floating head slider thereof.

In the present invention, a recording inductive head may be formed above the read head. The inductive head has core layers and a coil layer. The reference numeral 21 in FIG. 1 designates an upper shield layer, and the upper shield layer 21 may serve as a lower core layer of the inductive head as well as serving as a shield. The lower core layer, alternatively, may be formed individually and is separated from the upper shield layer 21 by an insulating layer.

The reference numeral 10 designates a first lower-shield sub-layer. The first lower-shield sub-layer 10 is formed of a magnetic material, such as a NiFe alloy (permalloy), a FeAlSi alloy (sendust), a CoFe alloy, or a CoFeNi alloy.

In order to serve as an excellent shield, the first lower-shield sub-layer 10 must have soft magnetic properties, such as a high magnetic permeability, a high saturation magnetic flux density, and a low coercive force. The above-described magnetic materials have these soft magnetic properties.

Preferably, the first lower-shield sub-layer 10 has a magnetic permeability of at least about 500. The specific resistance of the first lower-shield sub-layer 10 is very low and is several $\mu\Omega\cdot cm$.

A second lower-shield sub-layer 12 is formed of a material having a specific resistance higher than that of the first lower-shield sub-layer 10 on the first lower-shield sub-layer 10.

A lower gap layer 13 is formed of a general insulating material, such as $Al_2O_3$ or $SiO_2$, on the second lower-shield sub-layer 12.

A magnetic detecting element 14 is formed on the lower gap layer 13. In this embodiment, the magnetic detecting element 14 is composed of a multilayer film 15, which is shown in the center of the drawing, and a hard bias layer 16 and an electrode layer 17 formed on both sides of the multilayer film 15 in the X direction. The multilayer film 15 has a giant magnetoresistive structure (GMR structure) or an anisotropic magnetoresistive structure (AMR structure), a tunnel magnetoresistive structure, or the like. The structure of the multilayer film 15 will be more specifically described later.

An upper gap layer 18 is formed of an insulating material, such as $Al_2O_3$ or $SiO_2$, on the magnetic detecting element 14, like the lower gap layer 13.

A second upper-shield sub-layer 19 and a first upper-shield sub-layer 11 are formed on the upper gap layer 18, in that order. The second upper-shield sub-layer 19 has a specific resistance higher than that of the first upper-shield sub-layer 11.

The first upper-shield sub-layer 11 is formed of a magnetic material, such as a NiFe alloy (permalloy), a FeAlSi alloy (sendust), a CoFe alloy, or a CoFeNi alloy, like the first lower-shield sub-layer 10.

Functions of the second shield sub-layers 12 and 19, will now be described. The lower shield layer 20, which is separated from the magnetic detecting element 14 by the lower gap layer 13, is composed of two layers of the first lower-shield sub-layer 10 and the second lower-shield sub-layer 12, as shown in FIG. 1.

The upper shield layer 21, which is separated from the magnetic detecting element 14 by the upper gap layer 18, is also composed of two layers of the first upper-shield sub-layer 11 and the second upper-shield sub-layer 19.

The second lower-shield sub-layer 12 and the second upper-shield sub-layer 19 are formed of a magnetic material having a specific resistance higher than that of the first lower-shield sub-layer 10 and the first upper-shield sub-layer 11, respectively.

In order to achieve a high recording density, the gap length G1, which depends on the total thickness of the magnetic detecting element 14, the lower gap layer 13, and the upper gap layer 18, must be small. When the recording density is 40 to 70 Gbit/in$^2$, for example, the gap length G1 must be 600 Å or less.

As the gap length G1 becomes smaller, the thicknesses of the lower and upper gap layers 13 and 18 must be much smaller accordingly. As a result, the insulation between the gap layers 13 and 18 and the shield layers 20 and 21 is liable to be degraded. In order to solve this problem, in the present invention, the highly resistive second shield sub-layers 12 and 19 are provided in the respective shield layers 20 and 21 so as to oppose to the gap layers 13 and 18. Thus, the second shield sub-layers 12 and 19 as well as the gap layers 13 and 18 are electrically insulative.

Thus, sensing current flowing from the electrode layer 17 to the multilayer film 15 rarely diverges into the shield layers 20 and 21 to cause a current loss.

In addition, the second shield sub-layers 12 and 19, which are formed of a magnetic material, serve as shield layers as well as the first shield sub-layers 10 and 11.

The second shield sub-layers 12 and 19, of which the material will be specifically described later, must have a specific resistance higher than that of the first shield sub-layers 10 and 11, but does not necessarily have other advantageous characteristics. For example, soft magnetic characteristics including magnetic permeability of the second shield sub-layers 12 and 19 may be worse than those of the first shield sub-layers 10 and 11.

Preferably, the first shield sub-layers 10 and 11 are directly in contact with the second shield sub-layers 12 and 19, respectively, to form a ferromagnetic bonding between the first shield sub-layers 10 and 11 and the second shield sub-layers 12 and 19, as shown in FIG. 1.

This ferromagnetic bonding allows the soft-magnetic first shield sub-layers 10 and 11 to improve the soft magnetic characteristics of the second shield sub-layers 12 and 19, even if the second shield sub-layers 12 and 19 alone have worse soft magnetic characteristics.

Thus, the second shield sub-layers 12 and 19 not only serve as insulating layers with the gap layers 13 and 18, but also serve as shield layers with the first shield sub-layers 10 and 11.

The thicknesses of the first shield sub-layers 10 and 11 and the second shield sub-layers 12 and 19 will now be described.

In the present invention, preferably, the total thickness of the second lower-shield sub-layer 12 and the adjoining gap layer 13 and the total thickness of the second upper-shield sub-layer 19 and the adjoining gap layer 18 are in the range of 100 to 500 Å.

According to the present invention, even if the gap layers 13 and 18 become thinner to achieve a high recording density, insulation performance can be increased by setting the total thicknesses t5 and t6 within the above-described range.

Total thicknesses t5 and t6 more than 500 Å further increase insulation performance, but unfortunately, they lower heat dissipation performance.

The heat dissipation performance depends on the thermal conductivity of the gap layers 13 and 18 and the second shield sub-layers 12 and 19. A high thermal conductivity promises high heat dissipation performance and vice versa.

The gap layers 13 and 18 are generally formed of $Al_2O_3$, which has a relatively low thermal conductivity, or the like. On the other hand, the second shield sub-layers 12 and 19 are formed of an FeMO alloy described latter or the like in which an amorphous phase contains microcrystalline phases.

While a high crystallinity leads to an increased thermal conductivity, presence of the amorphous phase readily lowers the thermal conductivity. Hence, the gap layers 13 and 18 and the second shield sub-layers 12 and 19 have relatively low thermal conductivities. If the total thicknesses t5 and t6 of the gap layers 13 and 18 and the second shield sub-layers 12 and 19 become larger, the heat dissipation from these layers is likely to decrease accordingly. The total thicknesses t5 and t6 are, therefore, set to 500 Å or less in the present invention.

In the present invention, by setting the total thicknesses t5 and t6 within the range of 100 to 200 Å, a narrow-gap thin-film magnetic head having a recording density of 40 to 70 Gbit/in² can be achieved.

Preferably, the thicknesses t1 and t2 of the second shield sub-layers 12 and 19 are in the range of 20 to 200 Å.

If the thicknesses t1 and t2 are smaller than 20 Å, the insulation performance of the second shield sub-layers 12 and 19 is rapidly degraded, and thus the insulation between the magnetic detecting element 14 and the first shield sub-layers 10 and 11 cannot be ensured.

If the thicknesses t1 and t2 are larger than 200 Å, the insulation performance of the second shield sub-layers 12 and 19 is favorable. However, the heat dissipation of the thin-film magnetic head is degraded, and the shielding function of the second shield sub-layers 12 and 19 is degraded because of lowered soft magnetic characteristics thereof.

As described above, the ferromagnetic bonding between the first shield sub-layers 10 and 11 and the second shield sub-layers 12 and 19 improves the soft magnetic characteristics of the second shield sub-layers 12 and 19. If the thicknesses t1 and t2 of the second shield sub-layers are larger than 200 Å, however, the soft magnetic characteristics of the second shield sub-layers 12 and 19 cannot be improved, and thus the second shield sub-layers 12 and 19 cannot adequately serve as shields.

The thicknesses t1 and t2, therefore, are set within the range of 20 to 200 Å.

More preferably, the thicknesses t1 and t2 are in the range of 20 to 100 Å. In this instance, the total thicknesses t5 and t6 of the second shield sub-layers 12 and 19 and the gap layers 13 and 18 may be set within the range of 100 to 200 Å.

Preferably, the thicknesses t3 and t4 of the first shield sub-layers 10 and 11 are in the range of $5 \times 10^3$ Å to 3 $\mu$m.

If the thicknesses t3 and t4 are less than $5 \times 10^3$ Å, the shielding function of the first shield sub-layers 10 and 11 is unpleasantly degraded.

While large thicknesses t3 and t4 of the first shield sub-layers 10 and 11 improve the shielding function thereof, thicknesses t3 and t4 larger than 3 $\mu$m increase surface roughness, and thus make it difficult to form layers on the first shield sub-layers 10 and 11.

The thicknesses t3 and t4 of the first shield sub-layers 10 and 11 are, therefore, set within the range of 5×103 Å to 3 $\mu$m in the present invention.

Preferably, the ratios of the thicknesses t1 and t2 to the respective thicknesses of the shield layers 20 and 21, that is t1/(t1+t3) and t2/(t2+t4), are in the range of $6.5 \times 10^{-4}$ to $4 \times 10^{-2}$. Thus, the insulation performance and the soft magnetic characteristics of the second shield sub-layers 12 and 19 are improved, and the heat dissipation performance of the thin-film magnetic head is improved.

The second shield sub-layers 12 and 19 are formed of the following material.

In the present invention, preferably, the second shield sub-layers 12 and 19 are formed of a magnetic oxide.

(1) Mn—Zn ferrite or Ni—Zn ferrite

Since Mn—Zn and Ni—Zn ferrites have high specific resistances, the insulation performance of the second shield sub-layers 12 and 19 can be improved. Also, the ferromagnetic bonding between the first shield sub-layers 10 and 11 and the second shield sub-layers 12 and 19 improves the soft magnetic characteristics of the second shield sub-layers 12 and 19, and thus the second shield sub-layers 12 and 19 can effectively serve as shield layers in association with the first shield sub-layers 10 and 11.

(2) Magnetic oxides represented by $Fe_aM_bO_c$

M represents at least one element selected from the group consisting of Ti, Zr, Hf, Nb, Ta, Cr, Mo, Si, P, C, W, B, Al, Ga, Ge, and rare earth elements, and a, b, and c representing atomic ratios satisfy the relationships of $50 \leq a \leq 70$, $5 \leq b \leq 30$, $10 \leq c \leq 30$, and a+b+c=100.

FeMO alloys having this composition ensure a specific resistance of 400 to $2 \times 105$ $\mu\Omega$·cm.

(3) Magnetic oxides represented by $(Co_{1-g}T_g)_xM_yL_zO_w$

T represents Fe or Ni; M represents at least one element selected from the group consisting of Ti, Zr, Hf, Nb, Ta, Cr, Mo, Si, P, C, W, B, Al, Ga, Ge, and rare earth elements; L represents at least one element selected from the group consisting of Au, Ag, Cu, Ru, Rh, Os, Ir, Pt, and Pd; g representing an atomic ratio satisfies the relationship of $0 \leq b \leq 0.7$; y, z, and w representing atomic ratios satisfy the relationships of $3 \leq y \leq 30$, $0 \leq z \leq 20$, $7 \leq w \leq 40$, and $20 \leq y+z+w \leq 60$; and x represents the atomic ratio of the balance.

(COT)MLO alloys having this composition ensure a specific resistance of several thousand $\mu\Omega$·cm.

Instead of magnetic oxides, the second shield sub-layers 12 and 19 may be formed of the following magnetic materials.

(4) Magnetic materials represented by $Fe_dM_eN_fM$ represents at least one element selected from the group consisting of Ti, Zr, Hf, Nb, Ta, Cr, Mo, Si, P, C, W, B, Al, Ga, Ge, and rare earth elements, and d, e, and f representing atomic ratios satisfy the relationships of $60 \leq d \leq 80$, $10 \leq e \leq 15$, $5 \leq f \leq 30$, and d+e+f=100.

FeMN alloys having this composition ensure a specific resistance of 400 to $2 \times 105$ $\mu\Omega$·cm.

Since the magnetic materials (2) to (4) comprise an amorphous phase containing a large amount of oxides or nitrides of the element M and microcrystalline phases mainly containing Fe or mainly containing the element T and Co, the amorphous phase provably have a high specific resistance.

The second shield sub-layers 12 and 19 may be formed of materials other than the magnetic materials described above. Preferably, the materials used for the second shield sub-layers 12 and 19 have a specific resistance of 1000 $\mu\Omega$·cm or more.

Characteristics of the second shield sub-layers 12 and 19 will now be described.

As mentioned above, preferably, the second shield sub-layers 12 and 19 have a specific resistance of 1000 $\mu\Omega$·cm or more, and more preferably of $1 \times 10^4$ $\mu\Omega$·cm Such a specific resistance leads to improved insulation performance of the second shield sub-layers 12 and 19, and thus a thin-film magnetic head having excellent insulation performance can be achieved, even though the gap length becomes shorter.

Preferably, the magnetic permeability $\mu$ of the second shield sub-layers 12 and 19 is more than 200 or more when they are combined with the respective first shield sub-layers 10 and 11.

Specifically, the individual magnetic permeability $\mu$ of the second shield sub-layers 12 and 19 may be lower than 200. By combining the second shield sub-layers 12 and 19 with the first shield sub-layers 10 and 11, the ferromagnetic bonding between the first shield sub-layers 10 and 11 and the second shield sub-layers 12 and 19 increases the magnetic permeability $\mu$ to the range of 200 to 2000.

Thus increased magnetic permeability leads to an improved shielding function of the second shield sub-layers 12 and 19.

Preferred materials for the lower gap layer 13 and the upper gap layer 18 will now be described.

As mentioned above, the lower gap layer 13 and the upper gap layer 18 are formed of a general insulating material, such as $Al_2O_3$ or $SiO_2$, of which the thermal conductivity is relatively low. Preferably, the lower gap layer 13 and the upper gap layer 18 are formed of an insulative and thermal-conductive material. Increasing the thermal conductivity of the lower gap layer 13 and the upper gap layer 18 leads to an improved heat dissipation performance.

Preferably, the lower gap layer 13 and the upper gap layer 18 are formed of at least one insulating material selected from the group consisting of AlN, AlSiN, AlSiO, SiC, diamond like carbon (DLC), BN, MgO, SiAlON, AlON, $Si_3N_4$, SiCO, SiN, SiON, and SiCON. These materials have a thermal conductivity higher than that of $Al_2O_3$, which is used for conventional gap layers.

A process of preparing the second shield sub-layers 12 and 19 will now be described.

Preferably, the second shield sub-layers 12 and 19 are formed by sputtering with an existing system, such as an RF diode, an RF triode, an ion beam, and a facing target sputtering system. By forming the second shield sub-layers 12 and 19 by sputtering, the second shield sub-layers 12 and 19 can have thicknesses t1 and t2 in the preferred range described above, which must be smaller than those of the first shield sub-layers 10 and 11.

Alternatively, the second shield sub-layers 12 and 19 may be formed by vapor deposition, molecular beam epitaxy (MBE), ionized cluster beam (ICB), or the like.

In this sputtering process, the second shield sub-layers 12 and 19 are deposited with the above-described material, such as FeMO, used as a target, thus having a substantially uniform composition.

Alternatively, the second shield sub-layers 12 and 19 may be formed with a plurality of targets. For example, an Fe target, an iron oxide target, and a target comprising an oxide of the element M are used.

By supplying constant power to each target, the second shield sub-layers 12 and 19 can be deposited with a substantially uniform composition.

Also, power supply to these three targets may be changed. For example, when the second upper-shield sub-layer 19 is formed, more power is applied to the iron oxide target and the element M-oxide target in the early stage to increase the oxygen content of the early-stage layer. Thus, the second upper-shield sub-layer 19 has an adequately high specific resistance in the early stage. Then, power supply to the Fe target is gradually increased. As a result, the oxygen content of the surface of the second upper-shield sub-layer 19 decreases gradually and, in contrast, the Fe content increases while the surface is moving away from the magnetic detecting element 14.

By changing the amount of power supply when a plurality of targets are used, the oxygen content of the second shield sub-layers 12 and 19 can be changed according to the distance from the magnetic detecting element 14.

The second shield sub-layers 12 and 19 must be electrically insulative particularly at under surface side of the lower gap layer 13 and the upper surface side of the upper gap layer 18. As the distance from the magnetic detecting element 14 is getting shorter, the oxygen content of the second shield sub-layers 12 and 19 increases gradually, and accordingly, the specific resistance thereof become higher. Thus, the electrical insulation performance of the gap layers 13 and 18 and the second shield sub-layers 12 and 19 can be efficiently increased. Also, since the Fe content of the second shield sub-layers 12 and 19 gradually increases as the distance from the magnetic detecting element 14 is getting longer, the soft magnetic characteristics thereof can be ensured at the sides opposing the first shield sub-layers 10 and 11. By combining the second shield sub-layers 12 and 19 with the first shield sub-layers 10 and 11, ferromagnetic bonding is generated therebetween. The ferromagnetic bonding allows the soft magnetic first shield sub-layers 10 and 11 to improve the soft magnetic characteristics of the second shield sub-layers 12 and 19. In addition, if the second shield sub-layers 12 and 19 have soft magnetic characteristics in the sides opposing the first shield sub-layers 10 and 11 when they are formed, the soft magnetic characteristics can be further improved by the soft magnetic first shield sub-layers 10 and 11 with the ferromagnetic bonding therebetween.

Also, it is expected that the amount of microcrystalline phases of the second shield sub-layers 12 and 19 increases and, in contrast, the amount of amorphous phase decreases as the Fe content is increasing. Accordingly, if the Fe content of the second shield sub-layers 12 and 19 is increased as the distance from the magnetic detecting element 14 is getting longer, it is expected that the heat dissipation performance of the second shield sub-layers 12 and 19 can be improved.

A second embodiment will now be described with reference to FIG. 2. The same layers are designated by similar numerals.

The thin-film magnetic head of the second embodiment has the same structure as that of the first embodiment except for the lower shield layer.

While the lower shield layer 20 of the first embodiment is composed of the first lower-shield sub-layer 10 and the second lower-shield sub-layer 12 having a specific resistance higher than that of the first lower-shield sub-layer 10, the lower shield layer of the second embodiment is composed of only the first shield sub-layer 10.

On the other hand, the upper shield layer 21 is composed of two layers of the first upper-shield sub-layer 11 and the second upper-shield sub-layer 19 having a specific resistance higher than that of the first upper-shield sub-layer 11, like the first embodiment.

In the second embodiment, the electrode layer 17 of the magnetic detecting element 14 is opposed to the upper shield layer 21 with the gap layer 18 therebetween. The electrical insulation, therefore, needs to be ensured particularly between the electrode layer 17 and the upper shield layer 21.

Figure 2:
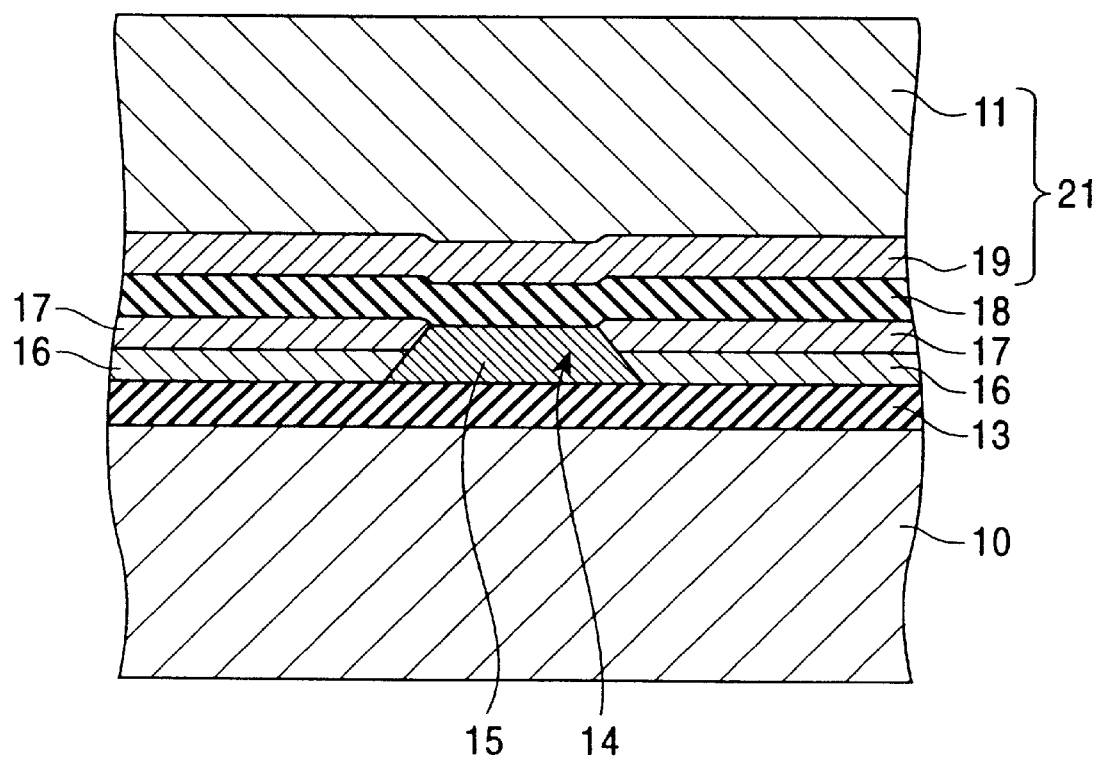
FIG. 2 is a fragmentary sectional view of a thin-film magnetic head according to a second embodiment of the present invention when viewed from a side opposing a recording medium.

Preferably, the upper shield layer 21 is composed of two layers, as shown in FIG. 2, so that the upper gap layer 18 and the second upper-shield sub-layer 19 ensure the electrical insulation above the electrode layer 17.

If the electrode layer 17 underlies the hard bias layer 16, it is, of course, preferable that the lower shield layer 20 is composed of two layers.

Figure 3:
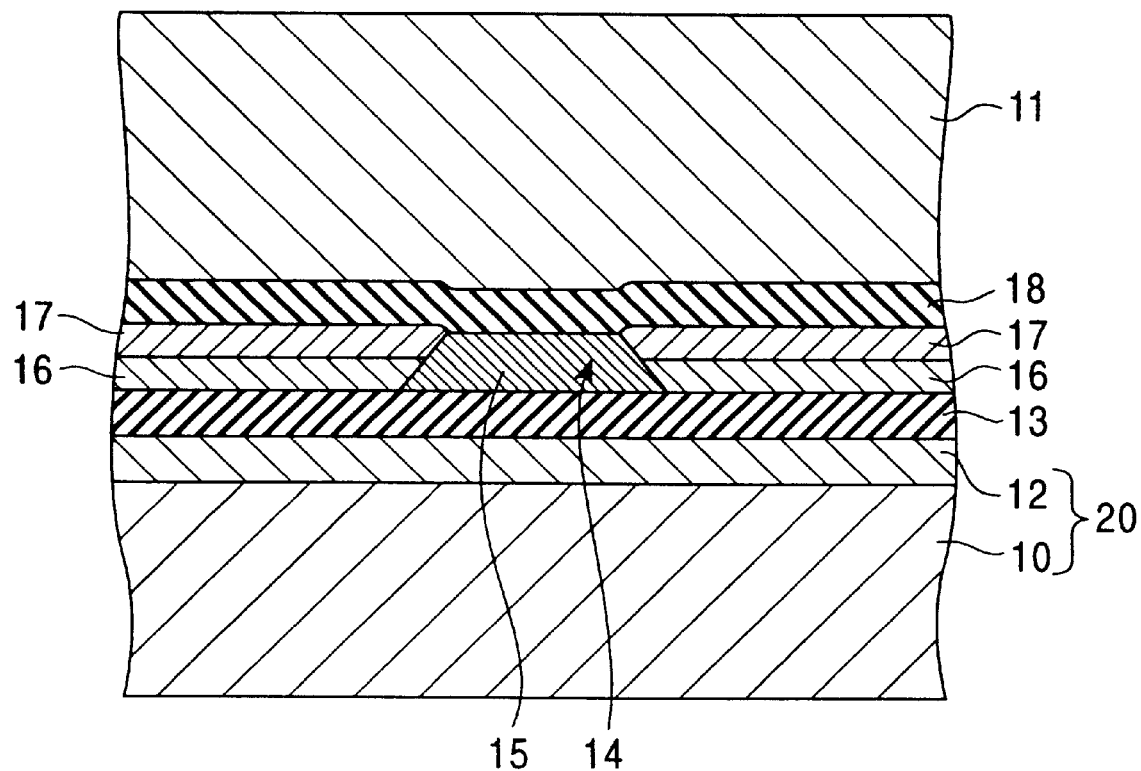
FIG. 3 is a fragmentary sectional view of a thin-film magnetic head according to a third embodiment of the present invention when viewed from a side opposing a recording medium.

FIG. 3 is a fragmentary sectional view of a thin-film magnetic head according to a third embodiment of the present invention when viewed from a side opposing a recording medium.

In this instance, only the lower shield layer 20 is composed of two layers in contrast with the second embodiment.

If the above-described magnetic materials (2) to (4), such as FeMO, FeMN, and CoMN, are used for the second lower-shield sub-layer 12, the deposited layer needs heating to form microcrystalline phases. The heating temperature is very high and is, for example, 400° C. or more.

If the upper shield layer is composed of two layers in which the second upper-shield sub-layer 19 is formed of any one of the above-described magnetic materials, the magnetic detecting element 14, which underlies the second upper-shield sub-layer 19, is likely to be much affected by heating.

Accordingly, if such a material that needs heating at high temperature is used for a second shield sub-layer, only the lower shield layer is, preferably, composed of two layers, and following the heating, the magnetic detecting element 14 is formed.

However, some magnetic materials such as CoMO do not need heating at high temperatures. If such a material that needs heating at a relatively low temperature, the upper shield layers may be composed of two layers, as shown in FIGS. 1 and 2.

Figure 4:
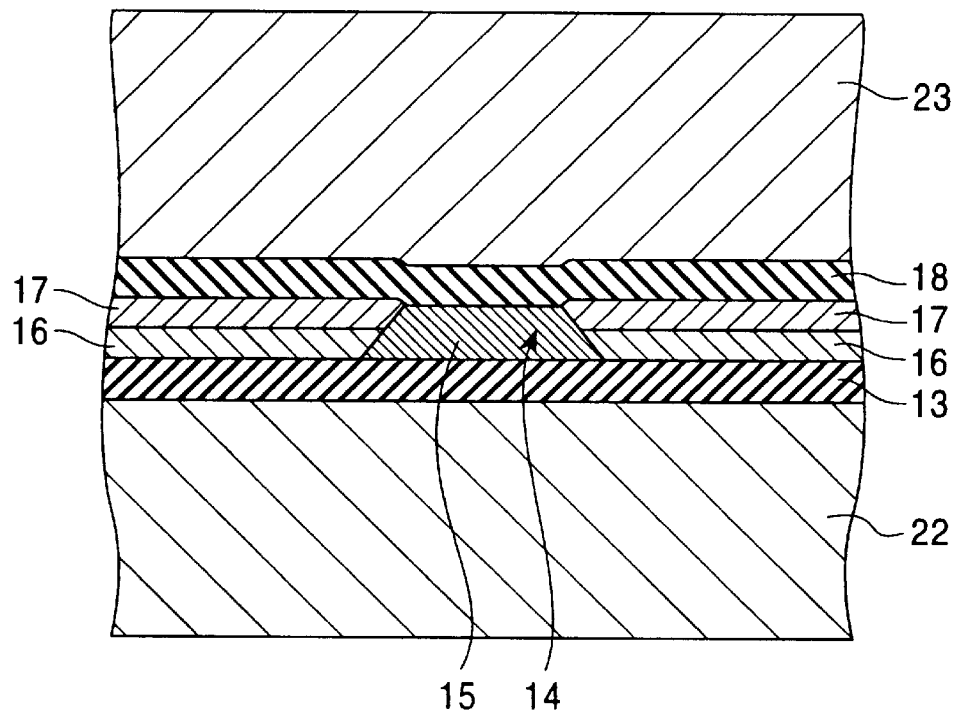
FIG. 4 is a fragmentary sectional view of a thin-film magnetic head according to a fourth embodiment of the present invention when viewed from a side opposing a recording medium.

FIG. 4 is a fragmentary sectional view of a thin-film magnetic head according to a fourth embodiment of the present invention when viewed from a side opposing a recording medium. The same layers are designated by similar numerals.

Figure 8:
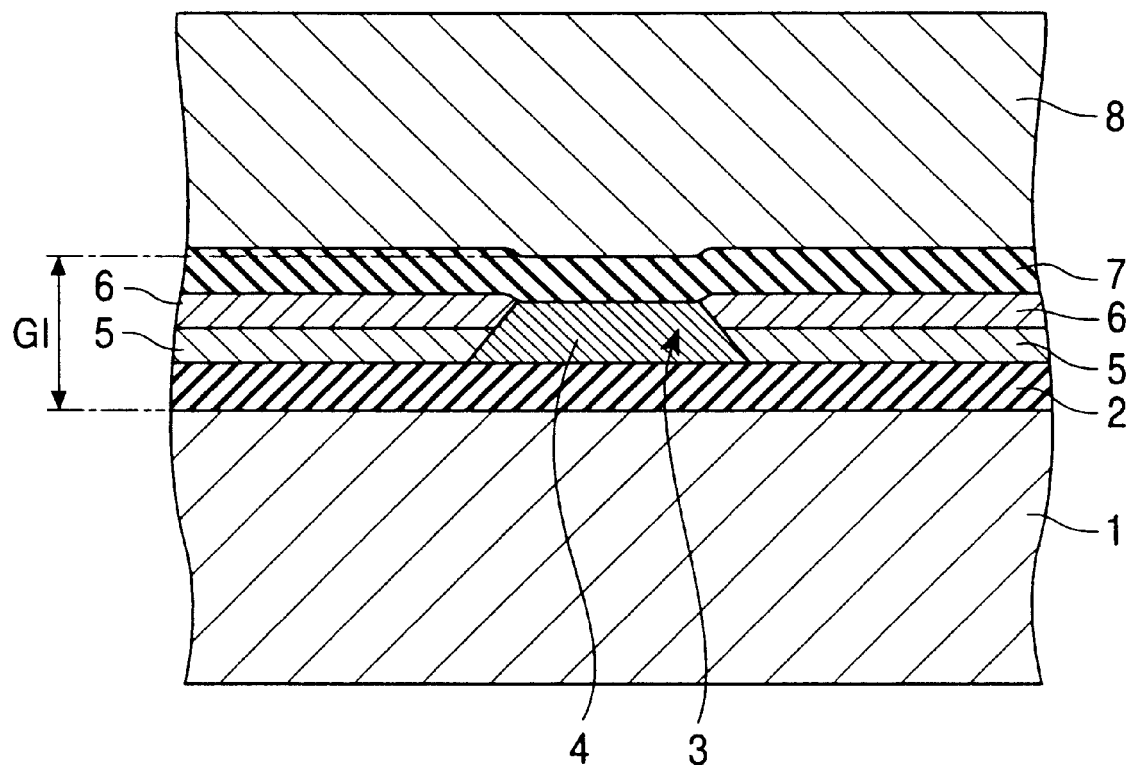
FIG. 8 is a fragmentary sectional view of a known thin-film magnetic head when viewed from a side opposing a recording medium.

In this embodiment, the lower shield layer 22 and the upper shield layer 23 are each composed of a monolayer (single layer). Hence, it seems to have the same structure as the known structure, as shown in FIG. 8.

However, the structure of the fourth embodiment is different in that the magnetic detecting element sides of the lower shield layer 22 and the upper shield layer 23 each have a higher resistive area than the other sides.

In order to give a higher specific resistance to the magnetic detecting element sides of the shield layers 22 and 23, the compositions of the shield layers 22 and 23 are changed by sputtering according to the distance from the magnetic detecting element 14.

For example, the shield layers 22 and 23 are formed of a FeMO alloy of (2) described above using three targets of Fe, an iron oxide, an oxide of the element M First, more power is supplied to the Fe target than to the iron oxide target and the element-M oxide target to deposit the lower shield layer until having a thickness of $5 \times 10^3$ Å to 3 $\mu$m. Thus, the Fe content of the lower shield layer 22 becomes high in this area; hence the oxygen content is low. This area of the lower shield layer 22, therefore, has a relatively low specific resistance and high soft magnetic characteristics.

In addition, since the high Fe content leads to a large amount of microcrystalline phases and a small amount of amorphous phase, it is expected that this area is heat dissipating.

Next, power supply to the iron oxide target and the element M oxide is gradually increased to increase the oxygen content of the lower shield layer 22 as the distance from the magnetic detecting element 14 is getting close. Thus, the specific resistance of the lower shield sub-layer 22 is increased at the vicinity of the magnetic detecting element 14. The composition ratios of FeMO in this high-oxygen-content area are in the range of the material (2) and the thickness of the area is set in the range of 20 to 200 Å.

On the other hand, when the upper shield layer 23 is formed, first, a lot of power is supplied to the iron oxide target and the element M-oxide target so that the upper shield layer 23 can have a high oxygen content at the vicinity of the magnetic detecting element 14 and thus have a high specific resistance. The composition ratios of the FeMO in this high-oxygen-content area are in the range of material (2) and the thickness of the area is set in the range of 20 to 200 Å.

Next, power supply to the Fe target is gradually increased to increase the Fe content of the upper shield layer 23 as the distance from the magnetic detecting element 14 is getting longer. Thus, the soft magnetic characteristics of the upper shield layer 23 are increased in the other area having a thickness of $5 \times 10^3$ to 3 $\mu$m. Since the high Fe content leads to a large amount of microcrystalline phases and a small amount of amorphous phase, it is expected that this area has heat dissipation performance.

The resulting lower shield layer 22 and the upper shield layer 23 have high resistive areas at the vicinity of the magnetic detecting element 14, thus improving the electrical insulation performance of the thin-film magnetic head in association with the gap layers 13 and 18. In addition, since the soft magnetic characteristics of the lower shield layer 22 and the upper shield layer 23 increase as the distances from the magnetic detecting element 14 is getting longer, the shielding function of the shield layers 22 and 23 can be ensured. Also, since the areas far from the magnetic detecting element 14 contain a large amount of microcrystalline phases, heat dissipation performance of these areas can be improved.

The magnetic materials (1), (3), and (4) may, of course, be used for the shield layers 22 and 23. If FeMN alloys described in (4) are used, the shield layers 22 and 23 are formed such that the magnetic detecting element sides thereof have a specific resistance higher than that of the other sides while the content of the element N of the material is adequately adjusted.

Such a shield layer that is deposited so as to have different composition ratios therein to have a higher specific resistance at the vicinity of the magnetic detecting element 14, as shown in FIG. 4, may be formed in at least either of the lower shield layer 22 and the upper shield layer 23.

In the fourth embodiment, the entire shield layers 22 and 23 are formed by sputtering. In the first and the second embodiment, the second shield sub-layers 12 and 19 may be formed by sputtering and the first shield sub-layers 10 and 11 may be formed by sputtering or plating.

Figure 5:
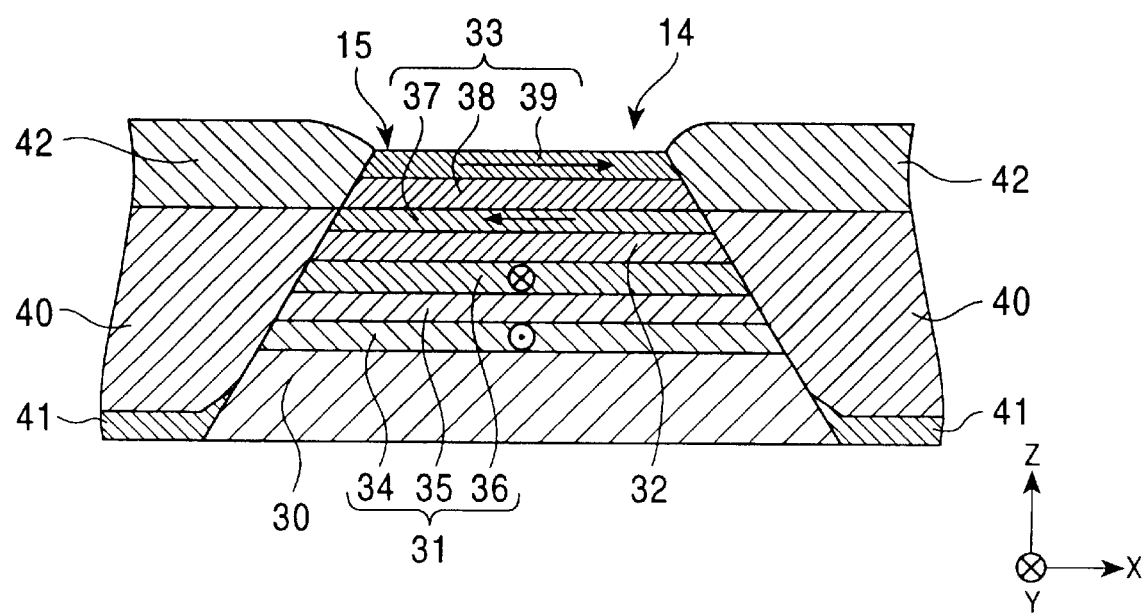
FIG. 5 is a fragmentary sectional view of a magnetic detecting element according to an embodiment of the present invention when viewed from a side opposing a recording medium.

The multilayer film 15 of the magnetic detecting element will now be described. FIG. 5 is a fragmentary sectional view of the magnetic detecting element 14 according to an embodiment when viewed from a side opposing a recording medium.

The magnetic detecting element 14 shown in FIG. 5 is a so called single spin-valve thin-layer sensor.

The multilayer film 15 comprises an antiferromagnetic layer 30, a pinned magnetic layer 31, a nonmagnetic conductive layer 32, and a free magnetic layer 33, upward in that order.

The antiferromagnetic layer 30 is formed of, for example, a PtMn alloy. The pinned magnetic layer 31 comprises a magnetic layer 34, a nonmagnetic interlayer 35, and a magnetic layer 36, in that order, to form a ferrimagnetic multilayer film. The magnetic layers 34 and 36 are formed of a magnetic material such as a NiFe alloy, a CoFeNi alloy, a CoFe alloy, or Co. The nonmagnetic interlayer 35 is formed of at least one nonmagnetic material selected from the group consisting of Ru, Rh, Ir, Cr, Re, and Cu.

The magnetic moments (saturation magnetization Ms×thickness t) of the magnetic layers 34 and 36 are set so as to be different from each other. For example, one magnetic layer 34 is magnetized in the direction opposite to the Y direction in the drawing and is pinned by an exchange coupling magnetic field generated between the antiferromagnetic layer 30 and the magnetic layer 34. The other magnetic layer 36 is magnetized and is pinned in the Y direction, which is opposite to the magnetization of the magnetic layer 34 by an exchange coupling magnetic field generated by the RKKY interaction between the magnetic layers 34 and 36.

The free magnetic layer 30 is also a ferromagnetic multilayer film like the pinned magnetic layer 31. The free magnetic layer 33 is composed of, for example, three layers of a magnetic layer 37, a nonmagnetic interlayer 38, and a magnetic layer 39.

The magnetic moments of the magnetic layers 37 and 39 are different from each other. As shown in FIG. 5, a hard bias layer 40 is formed of, for example, CoPt on both sides of the magnetic layer 37 in the track width direction, or the x direction in the drawing. The magnetic layer 37 is oriented in the opposite direction to the x direction by the vertical bias magnetic field from the hard bias layer 40. The magnetic layer 39 is oriented in the x direction by the exchange coupling magnetic field generated by the RKKY interaction between the magnetic layers 37 and 39, thus being pinned in the opposite direction to the magnetization of the magnetic layer 37.

As shown in FIG. 5, the hard bias layer 40 overlies an oriented layer 41 formed of, for example, Cr and underlies an electrode layer 42 formed of, for example, W or Cu.

Although the multilayer film 15 of the magnetic detecting element 14 comprises the antiferromagnetic layer 30, the pinned magnetic layer 31, the nonmagnetic interlayer 32, and the free magnetic layer 33, upward in that order, in this embodiment, they may be formed in the inverse order.

The pinned magnetic layer 31 and the free magnetic layer 33 do not need to be a ferrimagnetic multilayer film and may be a magnetic monolayer or multilayer film.

Although the electrode layer 42 overlies the hard bias layer 40, it may underlie the hard bias layer 40 on both sides of the multilayer film 15.

Figure 6:
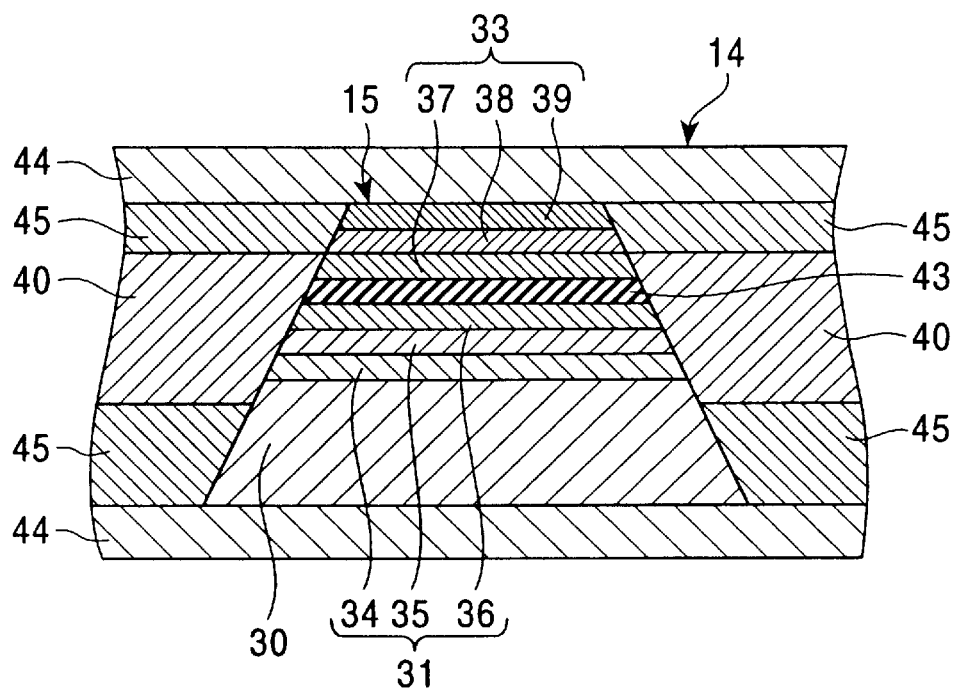
FIG. 6 is a fragmentary sectional view of a magnetic detecting element according to another embodiment of the present invention when viewed from a side opposing a recording medium.

FIG. 6 is a fragmentary sectional view of the magnetic detecting element 14 according to another embodiment of the present invention when viewed from a side opposing a recording medium.

The magnetic detecting element shown in FIG. 6 is a so called tunnel magnetoresistive sensor. While, in the magnetic detecting element 14 shown in FIG. 5, the nonmagnetic conductive layer 32 is formed of a nonmagnetic material such as Cu, the magnetic detecting element 14 shown in FIG. 6 has an interlayer 43 formed of an insulating material such as $Al_2O_3$ or $SiO_2$ between the pinned magnetic layer 31 and the free magnetic layer 33.

The multilayer film 15 of the magnetic detecting element 14 shown in FIG. 6 is formed between electrode layers 44. In the tunnel magnetoresistive sensor, when a voltage is applied to the two magnetic layers, that is pinned magnetic layer 31 and the free magnetic layer 33, a tunnel current flows in the interlayer 43, thus causing a tunnel effect.

The tunnel magnetoresistive sensor is used for detecting leakage magnetic fields from recording media in accordance with the tunnel effect principle.

In this embodiment, the multilayer film 15 is provided with the hard bias layer 40 on both sides thereof in the track width direction in the same manner in FIG. 5. Insulating layers 45 are disposed between the hard bias layer 40 and the electrode layers 40 so that any sensing current does not diverge from the electrode layers 44 into the hard bias layer 40.

The present invention may be applied to current-perpendicular-to-plane (CPP) spin-valve thin-film sensors, which have the same structure as shown in FIG. 6 except that the interlayer 43 is formed with the nonmagnetic conductive layer 32 shown in FIG. 5.

In such a structure that has two electrode layers 44 provided on both surfaces of the multilayer film 15, as shown in FIG. 6, preferably, the lower shield layer 20 and the upper shield layer 21 are each composed of two layers, as shown in FIG. 1. Thus, higher resistive second shield layers 12 and 19 disposed in the magnetic detecting element sides thereof improve electrical insulation performance.

Figure 7:
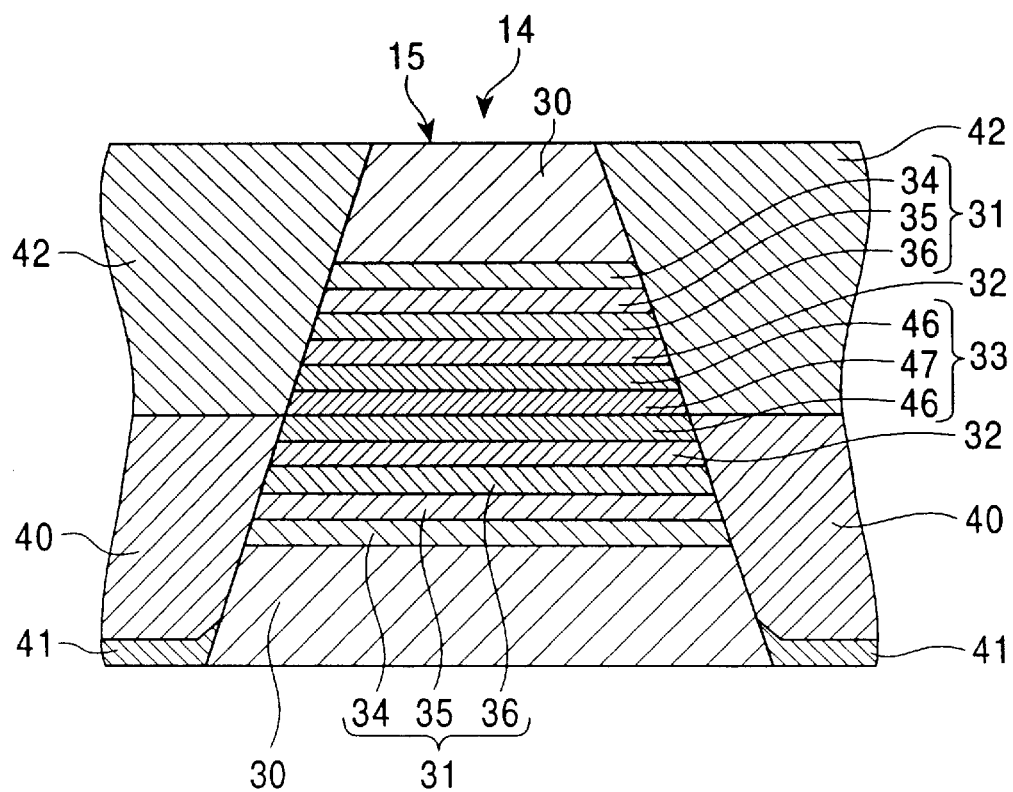
FIG. 7 is a fragmentary sectional view of a magnetic detecting element according to another embodiment of the present invention when viewed from a side opposing a recording medium.

FIG. 7 is a fragmentary sectional view of the magnetic detecting element 14 according to another embodiment of the present invention when viewed from a side opposing a recording medium.

The magnetic detecting element 14 shown in FIG. 7 is a so called dual spin-valve thin-film sensor, in which nonmagnetic conductive layers 32, pinned magnetic layers 31, and antiferromagnetic layers 30 are disposed on both surfaces of the free magnetic layer 33 in that order.

The free magnetic layer 33 is composed of three layers, that is, two magnetic layers 46 formed of a CoFe alloy, Co, or the like and another magnetic layer 47 formed of a NiFe alloy or the like. The former magnetic layers 46 serve to prevent metallic elements from diffusing between the nonmagnetic conductive layers 32 and the latter magnetic layer 47, thus improving the change in resistance ($\Delta R$) and the rate of change in resistance ($\Delta R/R$). The free magnetic layer 33 may be a ferrimagnetic multilayer film as shown in FIG. 5.

Also, the oriented film 41, the hard bias layer 40, and the electrode layer 42 are provided, upward in that order, on both sides of the multilayer film 15 in the track width direction.

The present invention may be applied to current-perpendicular-to-plane (CPP) spin-valve thin-film sensors in which the electrode layers 42 are disposed on both surfaces of the multilayer film 15 shown in FIG. 7. Also, the present invention may be applied to dual tunnel magnetoresistive sensors in which the nonmagnetic conductive layers 32 of the multilayer film 15 are replaced with the insulative interlayer 43 and in which electrode layers 42 are disposed on both surfaces of the multilayer film 15.

The magnetic detecting element may be an anisotropic magnetoresistive (AMR) sensor composed of three layers of a magnetoresistive (MR) layer formed of a NiFe alloy or the like, a shunt layer formed of Ta or the like, and a soft adjacent layer (SAL) formed of a NiFe alloy or the like.

According to the present invention, at least one of shield layers, which are disposed on the gap layers on both surfaces of a magnetoresistive sensor, has a higher resistive area in the magnetic detecting element side thereof than in the other side.

Specifically, the shield layers are each composed of two layers. The second shield sub-layers disposed in the magnetic detecting element side have a specific resistance higher than that of the first shield sub-layers disposed in the other side.

Thus, the electrical insulation of the thin-film magnetic head can be ensured by the gap layers and the second shield sub-layers. Even if the thickness of the gap layers and the gap length are decreasing, therefore, the insulation between the magnetic detecting element and the first shield sub-layers can be more improved.

Also, by forming the second shield sub-layers with a thin film capable of ensuring electrical insulation, a heat dissipating thin-film magnetic head can be achieved. In this magnetic head, even if the temperature of the magnetic detecting element increases as the current density is higher according to increase of the recording density, heat can be released through the gap layers and the second shield sub-layers to the first shield sub-layers.

While the second shield sub-layers are formed of a magnetic material having a specific resistance higher than that of the first shield sub-layers, the first shield sub-layers have excellent soft magnetic characteristics. By combining the first shield sub-layers with the second shield sub-layers, the ferromagnetic bonding therebetween improves the soft magnetic characteristics of the second shield sub-layers and thus the second shield sub-layers can adequately serve as shield layers in association with the first shield sub-layers.

What is claimed is:

1. A thin-film magnetic head comprising:
   a magnetic detecting element;
   gap layers disposed on both surfaces of the magnetic detecting element; and
   shield layers, each disposed on the corresponding gap layer and containing,
   wherein at least one of the shield layers has a first shield sub-layer and a second shield sub-layer, the second shield sub-layer is disposed more proximate to the corresponding gap layer than the first shield sub-layer and has a higher specific resistance than that of the first shield sub-layer, and
   wherein the second shield sub-layer comprises a magnetic material represented by $Fe_aM_bO_c$, wherein M represents at least one element selected from the group consisting of Ti, Zr, Hf, Nb, Ta, Cr, Mo, Si, P, C, W, B, Al, Ga, Ge, and rare earth elements, and a, b, and c represent atomic ratios that satisfy the relationships of $50 \leq a \leq 70$, $5 \leq b \leq 30$, $10 \leq c \leq 30$, and a+b+c=100.

2. A thin-film magnetic head according to claim 1, wherein the first shield sub-layer and the second shield sub-layer are in contact with each other.

3. A thin-film magnetic head according to claim 1, wherein a total thickness of the second shield sub-layer and the gap layer adjoining the second shield sub-layer is in the range of 100 to 500 Å.

4. A thin-film magnetic head according to claim 1, wherein the total thickness is in the range of 100 to 200 Å.

5. A thin-film magnetic head according to claim 3, wherein the thickness of the second shield sub-layer is in the range of 20 to 200 Å.

6. A thin-film magnetic head according to claim 4, wherein the thickness of the second shield sub-layer is in the range of 20 to 100 Å.

7. A thin-film magnetic head according to claim 1, wherein a thickness of the first shield sub-layer is in the range of $5 \times 10^3$ Å to 3 µm.

8. A thin-film magnetic head according to claim 1, wherein the second shield sub-layer is in contact with the corresponding gap layer.

9. A thin-film magnetic head comprising:
   a magnetic detecting element;
   gap layers disposed on both surfaces of the magnetic detecting element; and
   shield layers, each disposed on the corresponding gap layer and containing,
   wherein at least one of the shield layers has a first shield sub-layer and a second shield sub-layer, the second shield sub-layer is disposed more proximate to the corresponding gap layer than the first shield sub-layer and has a higher specific resistance than that of the first shield sub-layer, and
   wherein the second shield sub-layer comprises a magnetic material represented by $(CO_{1-g}T_g)_xM_yL_zO_w$, wherein T represents one of Fe and Ni; M represents at least one element selected from the group consisting of Ti, Zr, Hf, Nb, Ta, Cr, Mo, Si, P, C, W, B, Al, Ga, Ge, and rare earth elements; L represents at least one element selected from the group consisting of Au, Ag, Cu, Ru, Rh, Os, Ir, Pt, and Pd; g representing an atomic ratio satisfies the relationship of $0 \leq g \leq 0.7$; y, z, and w representing atomic ratios satisfy the relationships of $3 \leq y \leq 30$, $0 \leq z \leq 20$, $7 \leq w \leq 40$, and $20 \leq y+z+w \leq 60$; and x represents the atomic ratio of the balance.

10. A thin-film magnetic head according to claim 9, wherein the first shield sub-layer and the second shield sub-layer are in contact with each other.

11. A thin-film magnetic head according to claim 9, wherein a total thickness of the second shield sub-layer and the gap layer adjoining the second shield sub-layer is in the range of 100 to 500 Å.

12. A thin-film magnetic head according to claim 11, wherein the total thickness is in the range of 100 to 200 Å.

13. A thin-film magnetic head according to claim 11, wherein the thickness of the second shield sub-layer is in the range of 20 to 200 Å.

14. A thin-film magnetic head according to claim 12, wherein the thickness of the second shield sub-layer is in the range of 20 to 100 Å.

15. A thin-film magnetic head according to claim 9, wherein a thickness of the first shield sub-layer is in the range of $5 \times 10^3$ Å to 3 µm.

16. A thin-film magnetic head according to claim 9, wherein the second shield sub-layer is in contact with the corresponding gap layer.

17. A thin-film magnetic head comprising:
   a magnetic detecting element;
   gap layers disposed on both surfaces of the magnetic detecting element; and
   shield layers, each disposed on the corresponding gap layer and containing,
   wherein at least one of the shield layers has a first shield sub-layer and a second shield sub-layer, the second shield sub-layer is disposed more proximate to the corresponding gap layer than the first shield sub-layer and has a higher specific resistance than that of the first shield sub-layer, and
   wherein the second shield sub-layer comprises a magnetic material represented by $Fe_dM_eN_f$, wherein M represents at least one element selected from the group consisting of Ti, Zr, Hf, Nb, Ta, Cr, Mo, Si, P, C, W, B, Al, Ga, Ge, and rare earth elements, and d, e, and f representing atomic ratios satisfy the relationships of $60 \leq d \leq 80$, $10 \leq e \leq 15$, $5 \leq f \leq 30$, and d+e+f=100.

18. A thin-film magnetic head according to claim 17, wherein the first shield sub-layer and the second shield sub-layer are in contact with each other.

19. A thin-film magnetic head according to claim 17, wherein a total thickness of the second shield sub-layer and the gap layer adjoining the second shield sub-layer is in the range of 100 to 500 Å.

20. A thin-film magnetic head according to claim 19, wherein the total thickness is in the range of 100 to 200 Å.

21. A thin-film magnetic head according to claim 19, wherein the thickness of the second shield sub-layer is in the range of 20 to 200 Å.

22. A thin-film magnetic head according to claim 20, wherein the thickness of the second shield sub-layer is in the range of 20 to 100 Å.

23. A thin-film magnetic head according to claim 18, a thickness of the first shield sub-layer is in the range of $5 \times 10^3$ Å to 3 µm.

24. A thin-film magnetic head according to claim 18, wherein the second shield sub-layer is in contact with the corresponding gap layer.

* * * * *

UNITED STATES PATENT AND TRADEMARK OFFICE
CERTIFICATE OF CORRECTION

PATENT NO. : 6,765,768 B2
DATED : July 20, 2004
INVENTOR(S) : Masamichi Saito

It is certified that error appears in the above-identified patent and that said Letters Patent is hereby corrected as shown below:

Column 15,
Line 1, delete "claim 1," and substitute -- claim 3, -- in its place.

Signed and Sealed this

Twenty-first Day of December, 2004

JON W. DUDAS
*Director of the United States Patent and Trademark Office*